Dec. 29, 1925.

E. B. AYRES ET AL 1,567,891

DRIER

Filed Jan. 8, 1925 6 Sheets-Sheet 1

Inventors:—
Elwood B. Ayres.
Alpheus O. Huraxthal.
by their Attorneys,
Howson & Howson Dec. 29, 1925.  
E. B. AYRES ET AL  
1,567,891  
DRIER  
Filed Jan. 8, 1925  
6 Sheets-Sheet 2
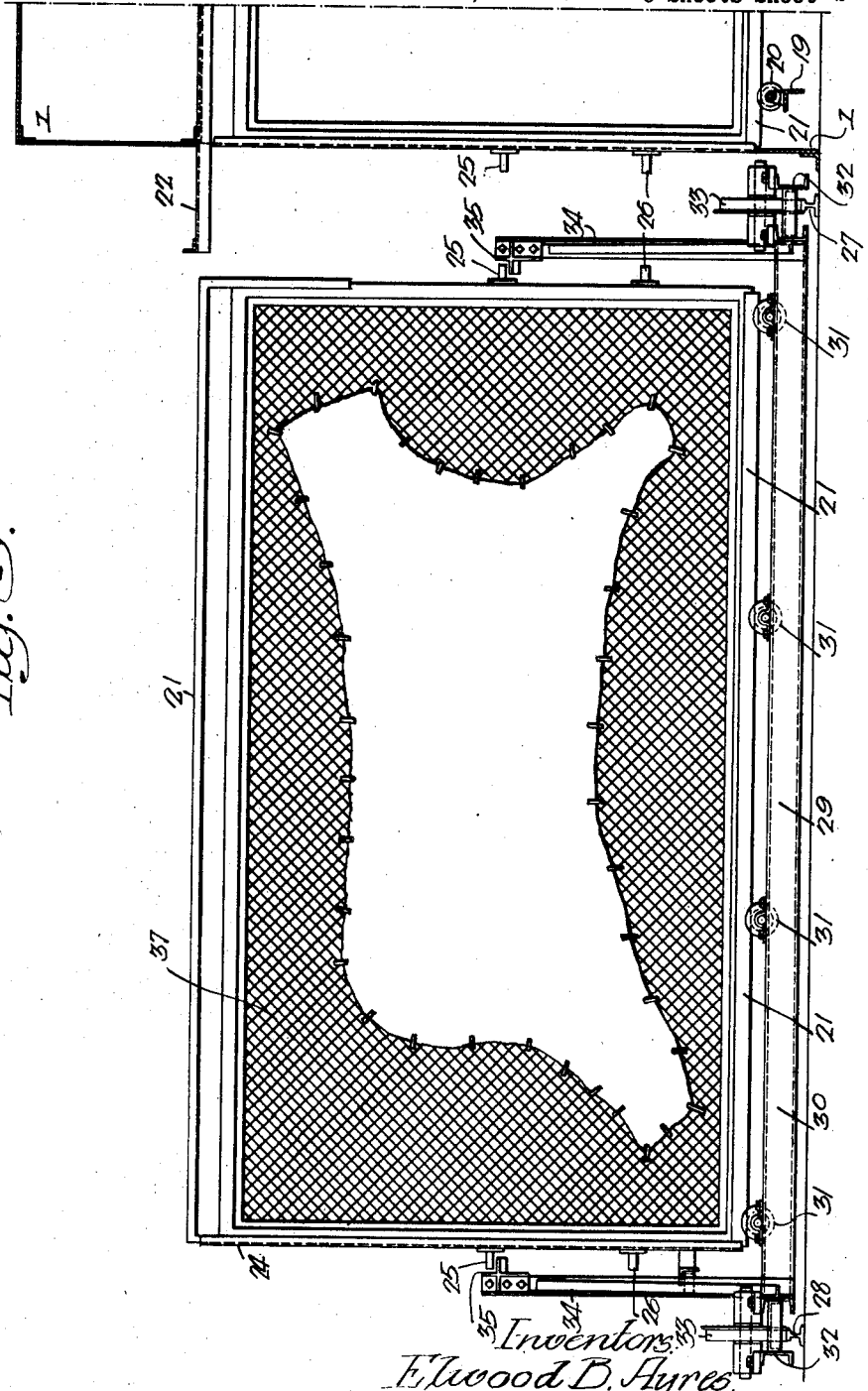
Fig. 5.
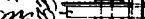

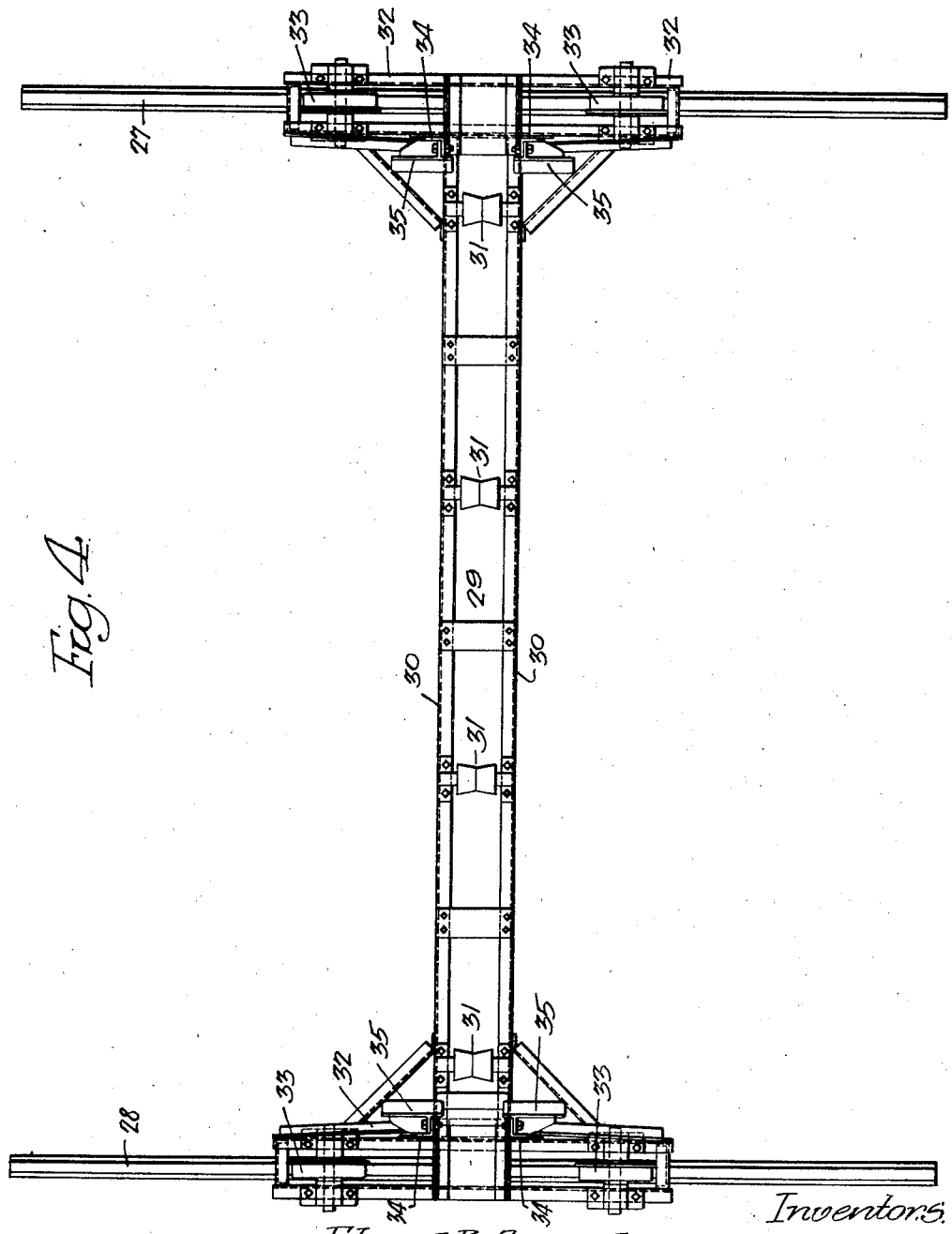

Dec. 29, 1925.
E. B. AYRES ET AL
1,567,891
DRIER
Filed Jan. 8, 1925
6 Sheets-Sheet 4
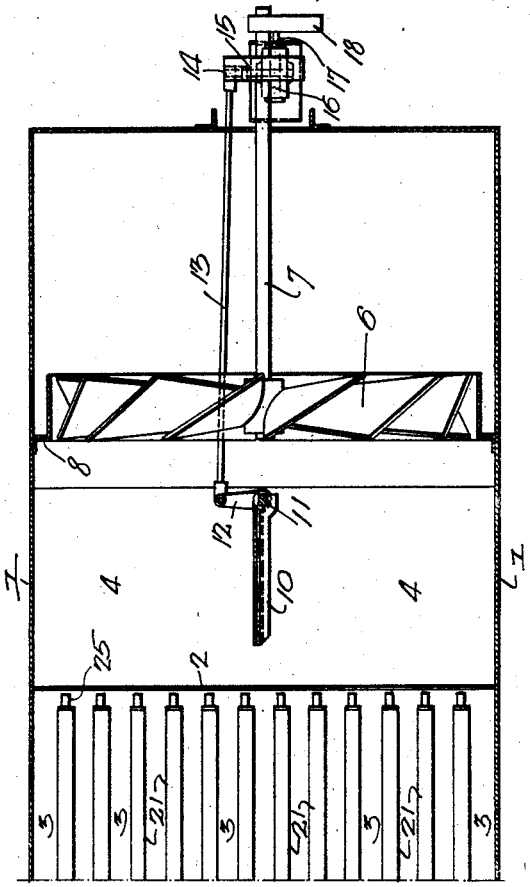
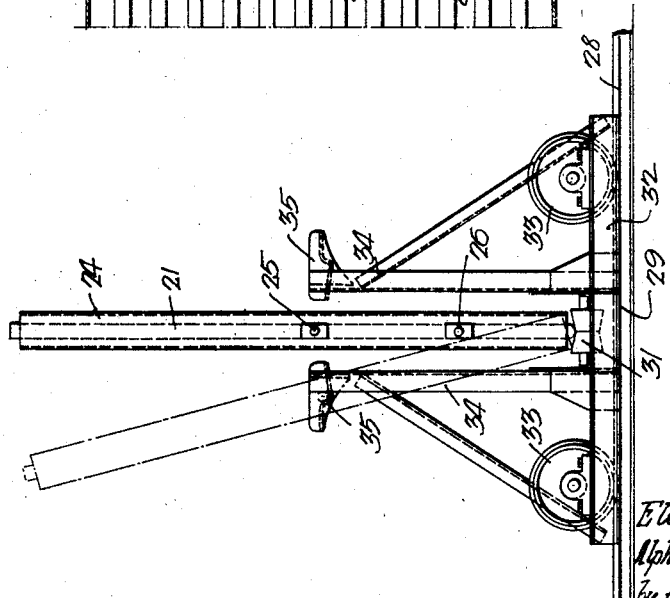

Dec. 29, 1925.

E. B. AYRES ET AL 1,567,891

DRIER

Filed Jan. 8, 1925      6 Sheets-Sheet 5

Inventors,-
Elwood B. Ayres.
Alpheus O. Hurxthal.
by their Attorneys,-
Howson & Howson Dec. 29, 1925.

E. B. AYRES ET AL 1,567,891

DRIER

Filed Jan. 8, 1925 6 Sheets-Sheet 6

Inventors
Elwood B. Ayres.
Alpheus O. Hurxthal.
by their Attorneys-
Howson & Howson Patented Dec. 29, 1925.

1,567,891

UNITED STATES PATENT OFFICE.

ELWOOD B. AYRES, OF MELROSE PARK, AND ALPHEUS O. HURXTHAL, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

DRIER.

Application filed January 8, 1925. Serial No. 1,248.

*To all whom it may concern:*

Be it known that we, ELWOOD B. AYRES and ALPHEUS O. HURXTHAL, citizens of the United States, residing, respectively, in Melrose Park, Montgomery County, Pennsylvania, and Philadelphia, Pennsylvania, have invented certain Improvements in Driers, of which the following is a specification.

Our invention relates to certain improvements in drying apparatus, particularly apparatus for drying leather, &c., which has to be stretched on frames.

One object of the invention is to construct the apparatus so that the drying frames can be run onto a truck on the outside of the drying chamber, the truck being movable longitudinally to a position in front of one of a series of frames.

Another object of the invention is to provide a baffle between the circulating fan and the drying chamber to insure uniform drying.

The invention also relates to certain details, which will be fully described hereinafter.

In the accompanying drawings:—

Fig. 3 is an enlarged view of a portion of Fig. 2, showing the complete truck and frame;

Fig. 4 is an enlarged plan view of the truck;

Fig. 5 is an end view of the truck;

Fig. 6 is an enlarged sectional plan view on the line 6—6, Fig. 2;

Figure 1:
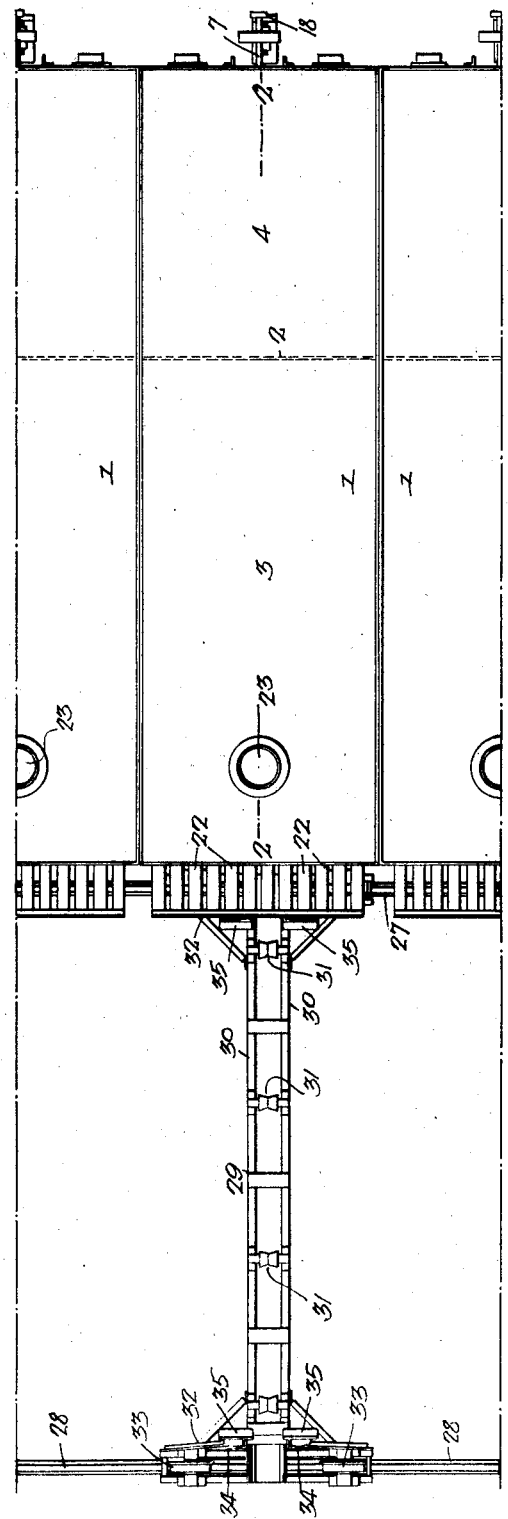
Fig. 1 is a plan view, illustrating one section of a drying apparatus and a truck.

The casing of the drier 1 may be of any length desired. A vertical partition 2 separates the drying chamber 3 from a chamber 4, in which are located the heating pipes 5 and the fan 6. The fan is located in an opening in a partition 8 and is set some distance back of the partition 2. A horizontal partition 9 encloses this space between the fan and the partition 2. In the space is a deflector 10, which is mounted on vertical pivots 11 and provided with an arm 12 to which a rod 13 is attached, which is connected to a crank 14 on a shaft 15 that is driven by a worm and worm wheel 16 from a shaft 17, which, in the present instance, is driven from the fan shaft 7 by a belt 18 so that the deflector 10 has an oscillating movement in order to distribute the currents of heated air as they pass to the drying chamber. In the drying chamber are a series of angle rails 19 on which are mounted a series of rollers 20, which support the independent drying frames 21. These drying frames are arranged close together in the drying chamber, as illustrated in Fig. 2, and are adapted to grooved rails 22 in the upper end of the drying chamber.

Figure 2:
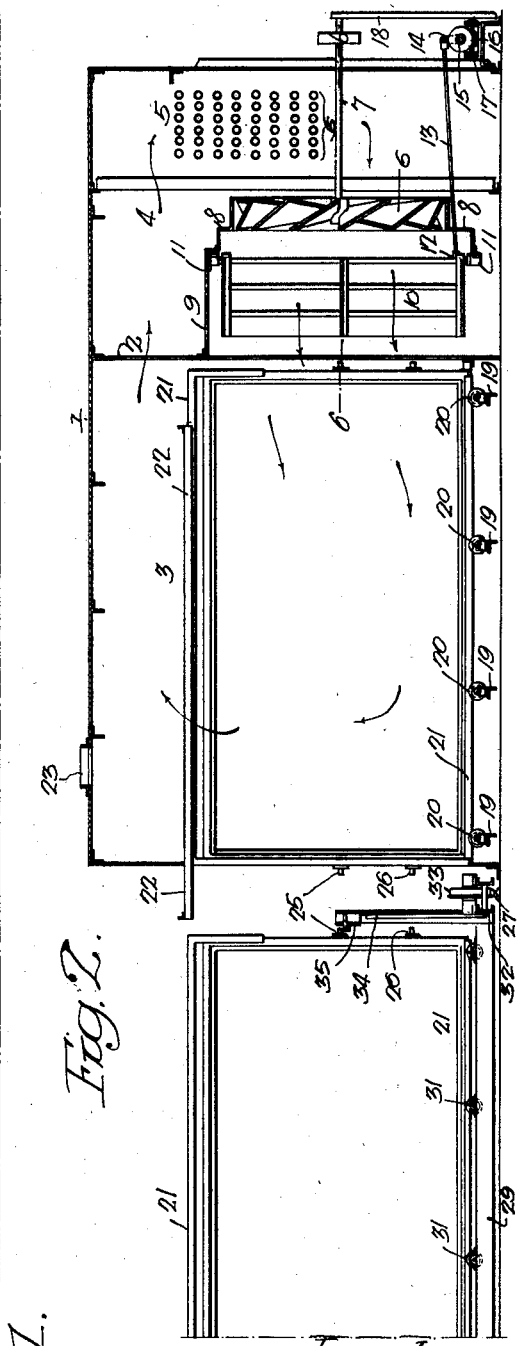
Fig. 2 is a longitudinal sectional view on the line 2—2, Fig. 1, illustrating one of the frames mounted on the truck.
Figure 8:
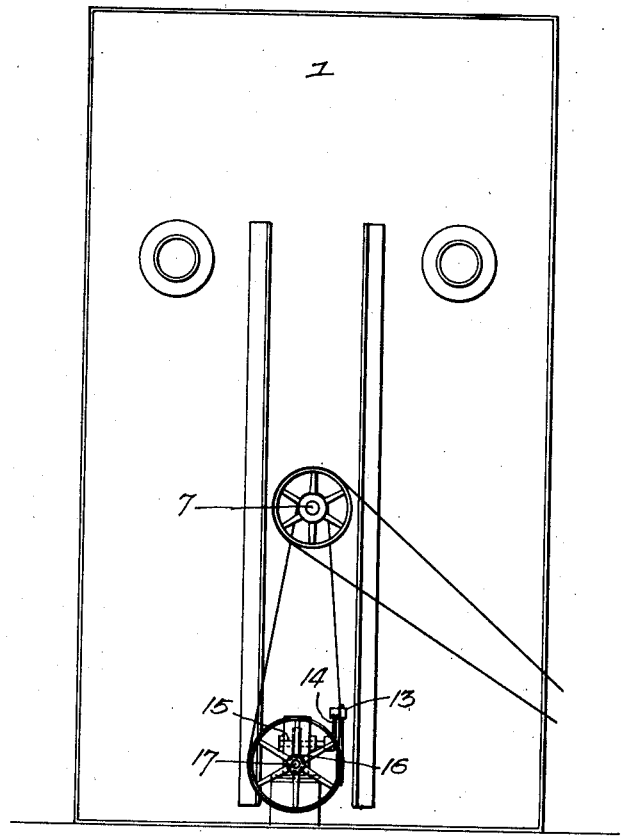
Fig. 8 is a rear view of the drying chamber.

It will be noticed that there is a considerable space between the upper ends of the drying frames and the roof of the drying chamber, which allows for the free circulation of air returning to the fan chamber, as indicated by the arrows in Fig. 2.

In the roof of the drying chamber is an exhaust opening 23, which can be connected to any suitable exhaust pipe for carrying off moist air.

Figure 7:
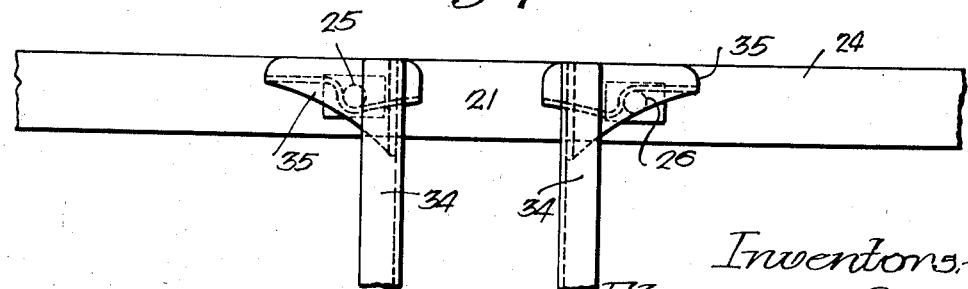
Fig. 7 is a detached view, similar to a portion of Fig. 5, showing a frame in a horizontal position.
Figure 9:
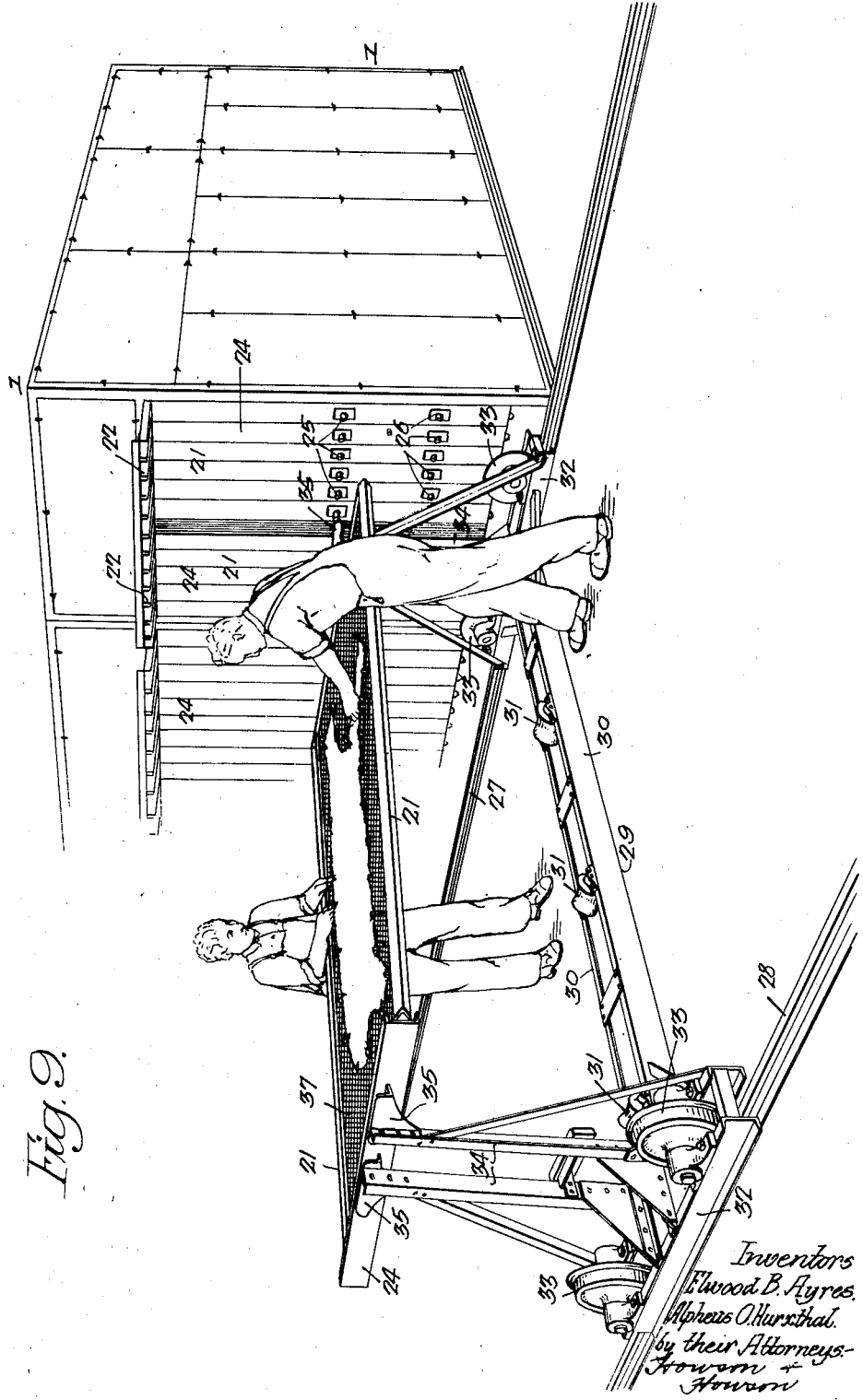
Fig. 9 is a perspective view of a section of the drier, showing one of the frames mounted in a horizontal position on the truck.

The front end 24 of each drying frame is of such a width that when a series of frames are within the drier, the front is closed. On each side of each frame are pivots 25. Below these pivots are projecting pins 26. In front of the drying chamber are two rails 27 and 28, which are spaced apart to form a track, as shown in Figs. 1 and 4. Mounted on the rails is a truck 29. This truck consists of two longitudinal members 30, on which are the bearings for the rollers 31 and end frames 32, in which are the bearings for the flanged wheels 33 that travel on the rails 27 and 28. The upright portions 34 of the frames are suitably braced and carry the socket plates 35, which are located on each side of the center of the truck, as shown clearly in Fig. 5. These socket plates are so located in respect to the pivots 25 of the frames that when the frames are pulled onto the truck, as illustrated in Figs. 3 and 5, the pivot pins 25 rest in the sockets of one set of plates 35 when the frame is tilted, as shown by dotted lines in Fig. 5, so that the operator can turn a frame to a horizontal position on the pivot pins 25. By moving the frame, the pin 26 at each end of the frame 21 can rest under the lower socket plate, as illustrated in Fig. 7. The frame will remain in this position, as the main pivot pins are off center.

The operator can then detach the dried material from a frame and can attach another piece thereto, after which the frame can be turned over on its pivots, and the material, which is secured to the other side, can be removed and another piece secured in position for drying. After this has been done, the frame is turned to a vertical position and rests on the rollers 31 of the truck, and can be moved into the drying chamber, after which the truck is moved into position in front of another frame and the operation is repeated.

In order to fasten the leather to be dried onto the frames, a foraminous section, or screen, 37 is secured to the frame, and toggles are attached to the edges of the leather and engage the foraminous section so as to stretch the leather on the frame to the proper degree.

While the truck has been illustrated in connection with a certain type of drier, in which heated air is circulated by a fan, it will be understood that the truck can be used in connection with other types of driers. In fact, it can be used in drying lofts where the frames are placed after the leather is stretched thereon.

We claim:

1. The combination in a drier, of a drying chamber; a series of frames carrying the material to be dried, said frames being arranged substantially parallel one with another and spaced apart; means for heating the air in circulation; a circulating fan at the rear of the drying chamber; a deflector located between the fan and the inner ends of the frames; means for oscillating the deflector to cause the heated air to be distributed evenly in the spaces between the frames, said frames being removable from the drying chamber.

2. The combination of a drier having a drying chamber and a fan chamber; means for heating the air in circulation; a series of vertically arranged frames in the drying chamber, said frames being spaced apart to form channels; a pivoted deflector mounted in front of the fan on vertical pivots; and means for oscillating the deflector to direct the air through the channels between the several vertically arranged frames in the drying chamber.

3. The combination of a drier having a drying chamber therein; a fan chamber back of the drying chamber; means, in the fan chamber, for heating the air in circulation; a series of vertically arranged frames in the drying chamber upon which the materials to be dried are mounted; a circulating fan spaced from one end of the drying chamber; a deflector, in front of the fan, mounted on vertical pivots; an arm on the deflector; a rod connected to the arm; a crank to which the opposite end of the rod is attached; and means for rotating the crank to cause the deflector to oscillate to distribute the air through the several spaces between the drying frames.

4. The combination of a drier having a drying chamber; means for circulating air in the drying chamber; a series of vertically arranged frames located in the drying chamber and capable of being withdrawn from the drying chamber; a track in front of the drying chamber; and a truck mounted on the track and arranged to receive the frames as they are withdrawn from the drying chamber and to support the frames in a horizontal position when the frames are turned.

5. The combination of a drier having a drying chamber; means for circulating air in the drier; a series of rollers in the bottom of the drying chamber; a series of rails in the upper portion of the drying chamber and in line with the rollers; a series of frames mounted on the rollers and arranged to be guided by the rails; pivot pins on the frames; a track in front of the drier; a truck mounted on the track, said truck having upright portions; and socket plates on said upright portions to receive the pivot pins of each frame, as it is withdrawn from the drier and turned.

6. The combination of a drier; means for circulating air in the drier; a series of movable frames located in the drier and capable of being withdrawn therefrom; a track in front of the drier; a truck on the track, said truck having a series of rollers upon which a frame travels as it is withdrawn from the drier; a pair of uprights at each end of the truck; and socket plates on the uprights, said plates having two pins at each end, one of said pins being a pivot pin and so arranged that when a frame is on the truck and is tilted, the pivot pins enter the sockets of one pair of socket plates so that the frame can be tilted to a horizontal position, the other pins on the frame being so located that they rest under the other socket plates.

7. The combination of a truck having a pair of socket plates at each end thereof; and a frame of a drier having two pins at each end, one of the pins at each end being a pivot pin and arranged off center, the other pin at each end being located some distance from the pivot pins and forming stops to limit the movement of the frame when it is tilted from a vertical position to a horizontal position.

8. The combination of a truck open at one end to receive a frame endwise; and a frame arranged to carry the material to be dried, the truck having supports for the frame on which it can be turned to allow the material to be attached thereto.

9. The combination of a truck having upright portions; sockets in the upright portions; and a frame having pins arranged to rest in the sockets so that the frame can be reversed, said frame having a foraminous body portion to which the leather can be attached.

10. The combination of a truck having wheels; two upright portions at each end spaced apart; a socket in each of said upright portions; and a frame having pivot pins at each end arranged to engage either of the sockets, said frame having a body portion to which the leather can be attached.

11. The combination of a truck having a longitudinal base; rollers mounted on the base to support a frame in the vertical position; uprights at each end of the truck having a socket; a frame to which the material to be dried is attached; and pins, on the frame, arranged to enter the sockets when the frame is moved to one side of the center so that the frame can be turned to a horizontal position and be supported by the sockets.

12. The combination of a drying chamber; a truck, having a base and upright portions, the upright portion at one end of the truck being spaced to allow a frame to be moved endwise onto the truck; and a carrying frame for the material to be dried adapted to the drying chamber and the truck.

13. A truck for supporting the frame carrying material to be dried, said truck having a base and uprights, the upright at one end of the truck having a vertical space through which a frame can be moved from a drier onto the frame.

ELWOOD B. AYRES.
ALPHEUS O. HURXTHAL.